United States Patent
Tews et al.

[11] Patent Number: 6,085,971
[45] Date of Patent: Jul. 11, 2000

[54] LUMINESCENT META-BORATE SUBSTANCES

[75] Inventors: Walter Tews, Lomonossowall 39, D-17491 Greifswald; Gundula Roth, Dortstrasse 13a, D-17498 Levenhagen; Ina Fethke, Greifswald, all of Germany

[73] Assignees: Walter Tews, Greifswald; Gundula Roth, Levenhagen, both of Germany

[21] Appl. No.: 09/392,279

[22] Filed: Sep. 9, 1999

Related U.S. Application Data

[63] Continuation-in-part of application No. 09/113,220, Jul. 10, 1998, abandoned.

[51] Int. Cl.$^7$ .............................. C09K 11/63; C09K 11/86; C09K 11/79; C09K 11/57; C09K 11/77
[52] U.S. Cl. .............................. 232/301.4 R; 252/301.6 R; 252/301.6 F; 252/301.4 R; 252/301.5; 252/301.6 P; 252/301.4 P
[58] Field of Search ................ 252/301.6 F, 301.4 R, 252/301.6 R, 301.5, 301.6 P, 301.4 P

[56] References Cited

U.S. PATENT DOCUMENTS

| | | |
|---|---|---|
| 4,319,161 | 3/1982 | Looye et al. . |
| 4,602,188 | 7/1986 | de Hair et al. . |
| 4,629,582 | 12/1986 | Terashima et al. . |
| 4,764,301 | 8/1988 | Awazu et al. . |
| 4,837,481 | 6/1989 | Verstegen et al. . |
| 4,891,550 | 1/1990 | Northrop et al. . |
| 5,043,308 | 8/1991 | Luetkins Jr., et al. . |

FOREIGN PATENT DOCUMENTS

| | | |
|---|---|---|
| 0 023 068 A1 | 1/1981 | European Pat. Off. . |
| 0 037 688 B1 | 10/1981 | European Pat. Off. . |
| 0 057 026 A1 | 8/1982 | European Pat. Off. . |
| 1-217096 | 8/1989 | Japan . |

OTHER PUBLICATIONS

1. Bernadette Saubat, et al., "Synthesis and Structural Study of the New Rare Earth Magnesium Borates LnMgB O (Ln=La, . . . , Er)", Journal of Solid State Chemistry, vol. 34, pp. 271–277 (1980).
2. T. Welker, "Recent Developments on Phosphors for Fluorescent Lamps and Cathode–Ray Tubes", Journal of Luminescence, vols. 48 and 49, pp. 49–56 (1991).
3. Smets: Mater. Chem. and Phys., vol. 16, pp. 286–299 (1987).

*Primary Examiner*—C. Melissa Koslow
*Attorney, Agent, or Firm*—Scully, Scott, Murphy & Presser

[57] ABSTRACT

The present invention relates to variously activated luminescent metaborates having luminescence properties improved in comparison with conventional luminescent substances. Moreover, the activated luminescent metaborates have outstanding stability under the influence of short-wave UV radiation so that they are preferably suitable for use in luminescent screens, in particular, low-pressure mercury vapor discharge lamps of all types and designs. The luminescent substances of the present invention are based on rare earth metal borates of the formula:

$$(Y,La)_{1-x-y-z}Ce_xGd_yTb_2(Mg,Zn,Cd)_{1-p}Mn_pB_{5-q-s}(Al,Ga)_q(X)_sO_{10}$$

wherein X is Si, Ge, P, Zr, V, Nb, Ta, W or the sum of a plurality of the stated elements and p, q, s, x, y and z are alternatively ≦1.

9 Claims, 3 Drawing Sheets

LUMINESCENT META-BORATE SUBSTANCES

RELATED APPLICATIONS

This application is a continuation-in-part application of U.S. application Ser. No. 09/113,220, filed Jul. 10, 1998. now abandoned.

FIELD OF THE INVENTION

The present invention relates to variously activated luminescent metaborate substances having luminescence properties improved in comparison with conventional luminescent substances and outstanding stability under the influence of short-wave UV radiation so that they are preferably suitable for use in luminescent screens, in particular in low-pressure mercury discharge lamps of all types and designs.

BACKGROUND OF THE INVENTION

Compounds which, owing to their typical terbium emission with a maximum wavelength of about 541–543 nm, emit in a narrow band are preferably used as green components in fluorescent lamps, in particular compact fluorescent lamps and triphosphor tube fluorescent lamps. These include the luminescent substances cerium magnesium aluminate, activated by Tb (CAT) according to U.S. Pat. No. 4,837,481; lanthanum phosphate, activated by Ce, Tb (LAP) according to GB 2 124 243 and U.S. Pat. No. 4,891,550; lanthanum phosphate silicate, activated by Ce, Tb (LAPS) according to U.S. Pat. No. 4,629,582; and $Y_2SiO_5$, activated by Ce, Tb according to EP 0 037 688 as the most important members. All these luminescent substances are distinguished by high thermal stability and luminous efficiency. The high production costs caused by the required preparation temperatures of 1300° C. to 1600° C. are disadvantageous.

A further luminescent substance which has its emission maximum at 542 nm is gadolinium magnesium pentaborate, activated by Ce, Tb, which is described in EP 0 023 068. Characteristic of the luminescent substance CBT is the relatively low production temperatures of only slightly above 1000° C. Owing to its high stability and its good emission properties, it is equivalent in use to the luminescent substances CAT, LAP, LAPS and $Y_2SiO_5$, activated by Ce, Tb. But the luminescent substance CBT owns the disadvantage, like most of the borate phosphors with their relative coarse-grained structure, irregular graining and the difficult way of production.

Another green-emitting luminescent substance consisting of $(La,Ce,Tb) PO_4$ became known by U.S. Pat. No. 4,764,301. After the substitution of one part of the phophoric acid for a boric acid group the temperature-versus-luminescence characteristics of this substance could be improved.

Futher luminescent substances became known by EP 0 057 026, based on rare earth metal metaborates of the formula $(Y,La)_{1-x-y-z}Ce_xGd_yTb_z(Mg,Zn)_{1-p}Mn_pB_5O_{10}$, as well in U.S. Pat. No. 4,319,161 of the formula $(Y,La)_{1-x-y-z}Ce_xGd_yTb_z(Mg,Zn)_{1-p}Mn_pB_5O_{10}$, in U.S. Pat. No. 4,602,188 of formula $Ln(Mg,Zn,Cd)B_5O_{10}$, activated by Ce, Mn, in which Ln may be the elements Y, La, and/or Gd and in U.S. Pat. No. 5,043,308 of the formula $LnAl_{1.67-0.67X}(B_4O_{10})O_X$, in which Ln is an element of the group IIIB. The common disadvantage of these luminescent substances is also the difficult processing way.

It is the object of the present invention to develop a luminescent substance which has further improved emission and processing properties and can be used both in straight fluorescent lamps and in compact energy-saving lamps. The present invention relates to variously activated luminescent metaborate substances having luminescence and particles properties improved in comparison with conventional luminescent substances and outstanding stability under the influence of short-wave UV radiation so that they are preferably suitable for use in luminescent screens, in particular in low-pressure mercury vapor discharge lamps of all types and designs. The luminescent substances according to the present invention are based on special rare earth metal metaborates with the monocline pentaborate structure and of the formula $(Y,La)_{1-x-y-z}Ce_xGd_yTb_z(Mg,Zn,Cd)_{1-p}Mn_pB_{5-q-s}(Al,Ga)_q(X)_sO_{10}$, in which X is Si, Ge, P, Zr, V, Nb, Ta, W or two or more than two of the stated elements and p, q, s, x, y and z are alternatively ≦1. It is noted that in the above formula (Y,La) includes Y and/or La; (Mg,Zn,Cd) includes Mg and/or Zn and/or Cd; and (Al,Ga) includes Al and/or Ga.

The luminescent substances may be used individually or as a mixture of a plurality thereof for the luminescent layer of screens or in low-pressure mercury discharge lamps.

DETAILED DESCRIPTION OF THE INVENTION

The present invention relates to variously activated luminescent metaborate substances for luminescent layer of screens and low-pressure mercury discharge lamps and based on special rare earth metal metaborates with the monocline pentaborate structure of the general formula $(Y,La)_{1-x-y-z}Ce_xGd_yTb_z(Mg,Zn,Cd)_{1-p}Mn_pB_{5-q-s}(Al,Ga)_q(X)_sO_{10}$, in which X is Si, Ge, P, Zr, V, Nb, Ta, W or two or more than two of the elements mentioned and furthermore

| | |
|---|---|
| a) y = z = p = 0<br>0 ≦ q ≦ 1.0<br>0 < s ≦ 1.0 or | 0.01 ≦ x ≦ 1.0 |
| b) z = p = 0 and y ≠ 0<br>0.02 ≦ y ≦ 0.80<br>0 ≦ q ≦ 1.0<br>0 < s ≦ 1.0 or | 0.01 ≦ x ≦ 1 − y |
| c) p = 0 and z ≠ 0<br>0 ≦ y ≦ 0.98<br>y + z ≦ 0.99<br>0.01 ≦ z ≦ 0.75<br>0 ≦ q ≦ 1.0<br>0 < s ≦ 1.0 or | 0.01 ≦ x ≦ 1 − y − z |
| d) z = 0 and p ≠ 0<br>0 ≦ y ≦ 0.99<br>0.01 ≦ p ≦ 0.30<br>0 ≦ q ≦ 1.0<br>0 < s ≦ 1.0 or | 0.01 ≦ x ≦ 1 − y |
| e) p ≠ 0 and z ≠ 0<br>0 ≦ y ≦ 0.98 | 0.01 ≦ x < 1 − y − z |

-continued $0.01 \leq z \leq 0.75$
$x + z \leq 0.99$
$0.01 \leq p \leq 0.30$
$0 \leq q \leq 1.0$
$0 < s \leq 1.0.$ These luminescent compounds all demonstrably have the monoclinic structure with the space group $P2_1/c$, which is similar to that of $LnMgB_5O_{10}$, according to B. Saubat, M. Vlasse and C. Fouassier, J. of Solid State Chem. 34 (1980) 3, pages 271–277.

Due to the incorporation of an element X, the structure data is slightly shifted compared to common pentaborate.

The luminescent substances according to the present invention have emission maxima at about 542 nm and/or broad emission bands at about 630 nm. The shape and position of the emission band are closely related to the amount and the type of the element X incorporated and are finally the result of a changed crystal field splitting.

One or more of these luminescent metaborate substances can be used in luminescent screens and for luminescent layers or in the luminescent layer of a low-pressure mercury discharge lamp. The luminescent metaborate substances are arranged on the inside of the discharge vessel of the low-pressure mercury discharge lamps having a diameter greater than 5 mm, the radiant UV power of the discharge being greater than 200 W per m².

The present invention is explained in more detail below with reference to various examples with test results.

Figure 1:
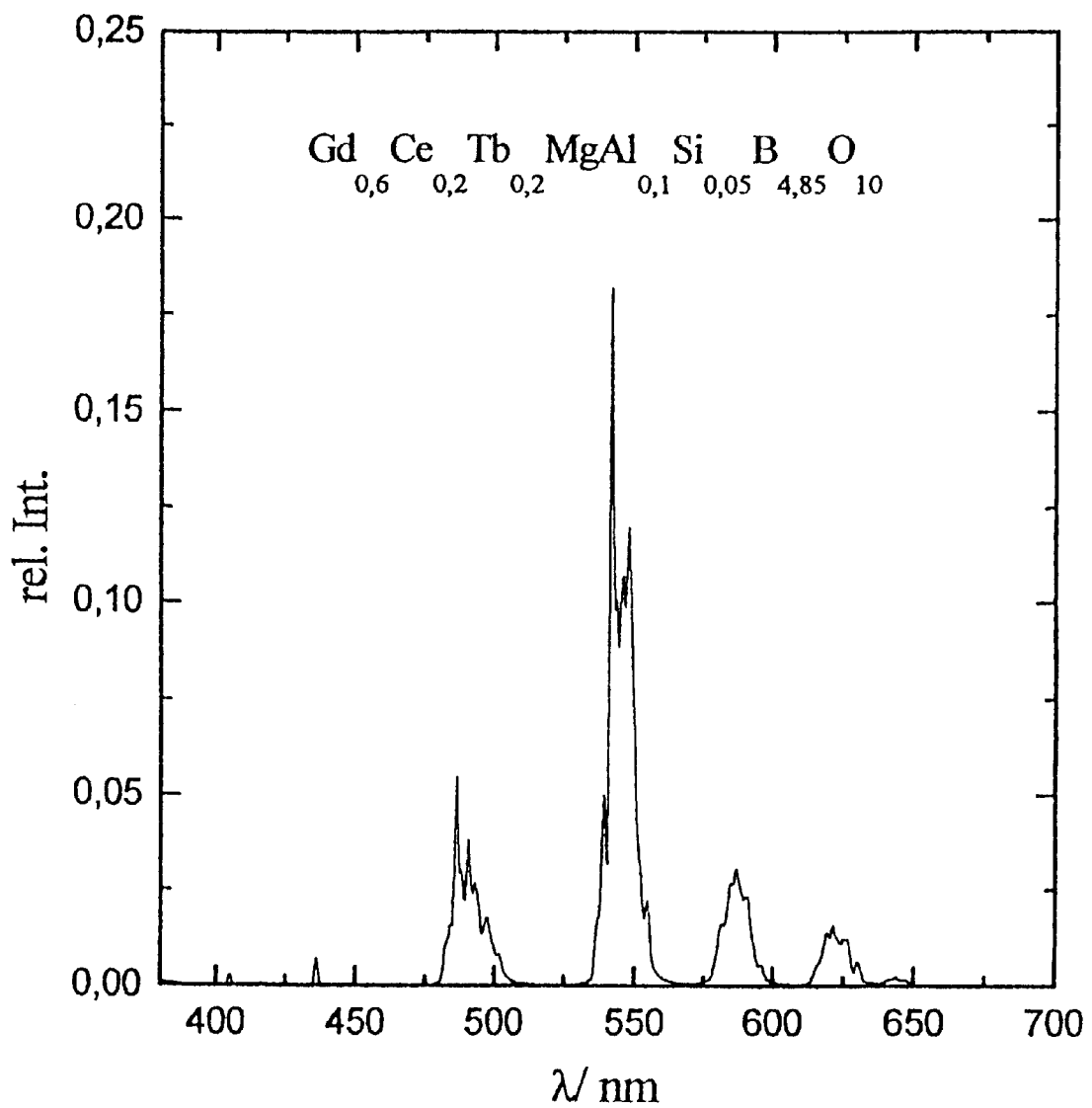
FIG. 1 is a plot of relative emission intensity vs. λ(nm) for the compound $Gd_{0.6}Ce_{0.2}Tb_{0.2}MgAl_{0.1}Si_{0.05}B_{4.85}O_{10}$.
Figure 2:
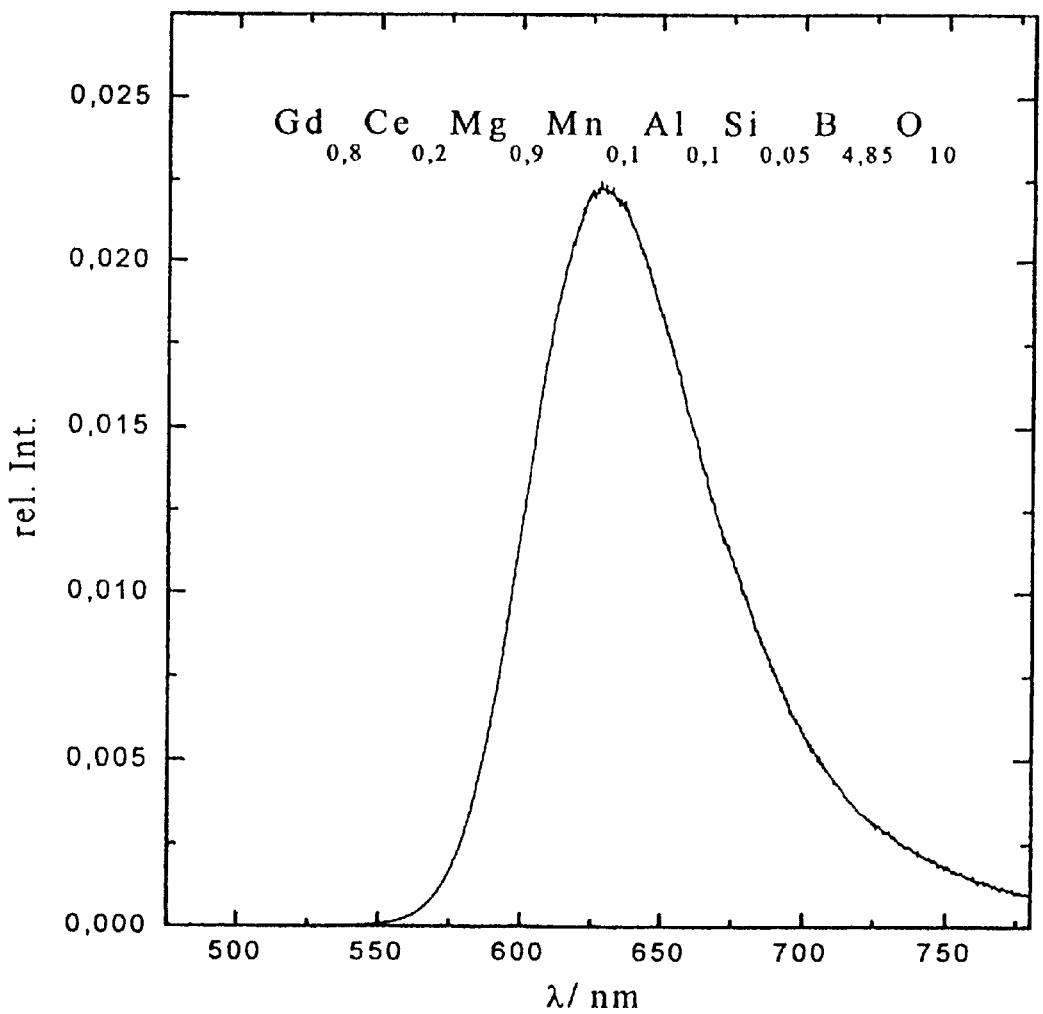
FIG. 2 is a plot of relative emission intensity vs. λ(nm) for the compound $Gd_{0.8}Ce_{0.2}Mg_{0.9}Mn_{0.1}Al_{0.1}Si_{0.05}B_{4.85}O_{10}$.
Figure 3:
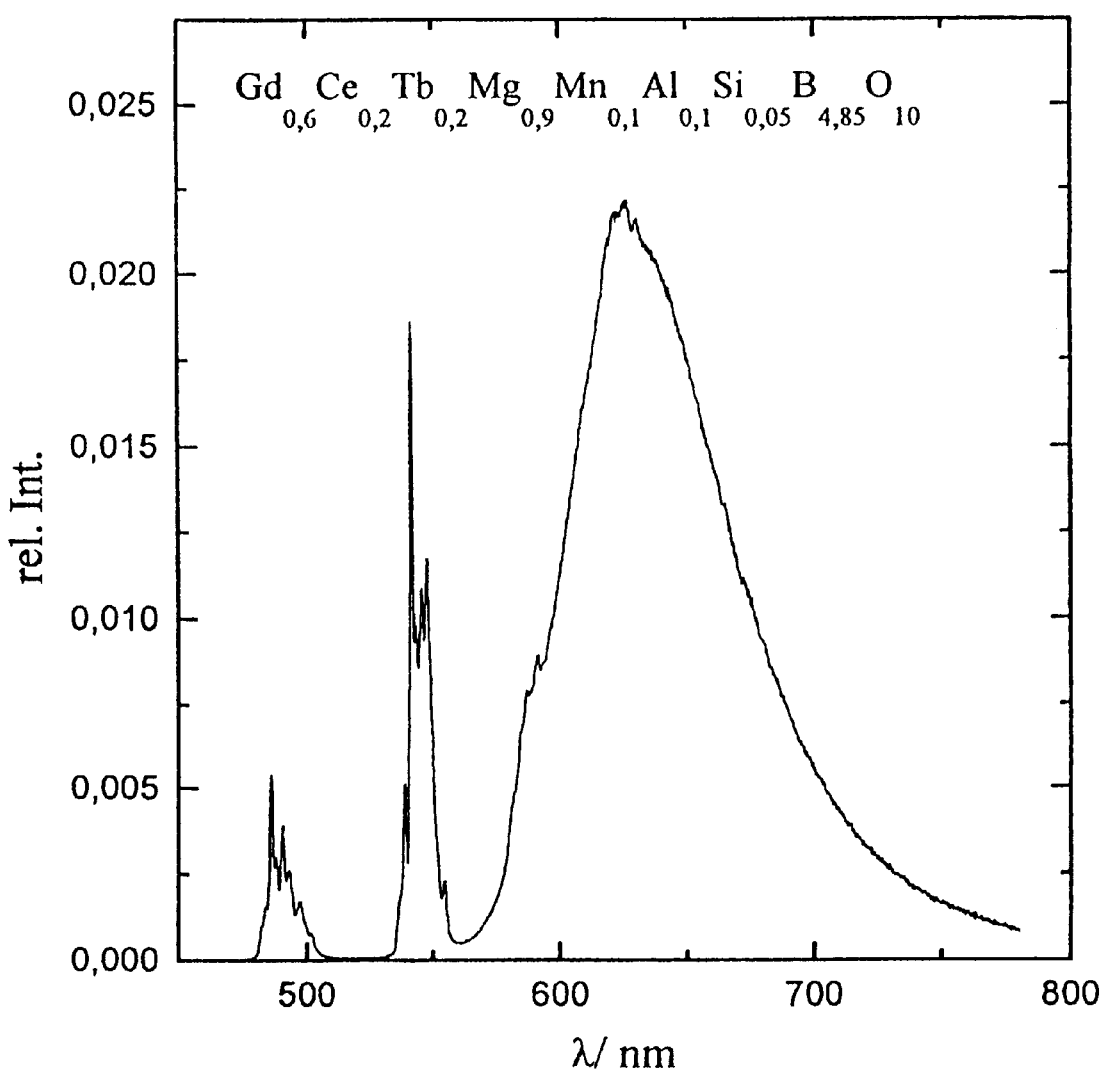
FIG. 3 is a plot of relative emission intensity vs. λ(nm) for the compound $Gd_{0.6}Ce_{0.2}Tb_{0.2}Mg_{0.9}Mn_{0.1}Al_{0.1}Si_{0.05}B_{4.85}O_{10}$.

The luminescent substances according to the invention and the test results on samples are reproduced in Tab. 1–5 and in FIG. 1–3.

In these Tab. 1–4, Rel. int. denotes the relative emission intensity at the emission maximum; Rel. integr. intensity denotes the relative integral emission intensity and q denotes the relative quantum yield. The unsubstituted samples of the luminescent substance (X=0) were used as standard for the comparison of the quantum yields, with data from Welker in J. of Luminescence 48/49 (1991), page 53, and Smets in Mater. Chem. and Phys. 16 (1987), page 292.

EXAMPLE 1

Luminescent substance according to Tab. 2, Example No. 1, having the formula $$Gd_{0.6}Ce_{0.2}Tb_{0.2}MgAl_{0.1}Si_{0.05}B_{4.85}O_{10} \quad (BSCT).$$

The starting materials are:

| | |
|---|---|
| $H_3BO_3$ | 5.176 g |
| $CeO_2$ | 0.431 g |
| $Gd_2O_3$ | 1.360 g |
| $MgCO_3$ | 1.230 g (0.05 mol excess) |
| $SiO_2$ | 0.038 g |
| $Tb_4O_7$ | 0.457 g |
| $Al_2O_3$ | 0.064 g |

Preparation: The starting materials in oxidic form or comprising substances which can be converted into the oxides are mixed in the above mentioned ratio with a 0.05 mol excess of magnesium and an excess of boric acid between 5% and 50%, depending on reaction conditions, and are subjected to preliminary ignition at 600° C. for 30 min. After the formation of the intermediate, the latter is further heated to 1035° C. in a corundum crucible and ignited for 3 h at this reaction temperature under reducing conditions in a nitrogen/hydrogen mixture. The end product is washed with water, dried and sieved. It has small particles with $d_{50}$=4.9 μm compared with other common borate phosphors. The compound obtained has an emission maximum at 542 nm, as shown in FIG. 1.

EXAMPLE 2

Luminescent substance according to Tab. 2, Example No. 4, having the formula $$Gd_{0.6}Ce_{0.2}Tb_{0.2}MgAl_{0.1}Si_{0.1}B_{4.85}O_{10} \quad (BSCT).$$

The starting materials are:

| | |
|---|---|
| $H_3BO_3$ | 5.176 g |
| $CeO_2$ | 0.431 g |
| $Gd_2O_3$ | 1.360 g |
| $MgCO_3$ | 1.230 g (0.05 g excess) |
| $SiO_2$ | 0.075 g |
| $Tb_4O_3$ | 0.467 g |
| $Al_2O_3$ | 0.064 g |

Preparation: The preparation is carried out analogously to Example No. 1 in Tab. 1. The luminescent compound obtained has an emission maximum at 542 nm.

EXAMPLE 3

Luminescent substance according to Tab. 2, Example No. 7, having the formula $$Gd_{0.8}Ce_{0.2}Mg_{0.9}Mn_{0.1}Al_{0.1}Si_{0.05}B_{4.85}O_{10} \quad (BSCM).$$

The starting materials are:

| | |
|---|---|
| $H_3BO_3$ | 12.748 g |
| $CeO_2$ | 1.291 g |
| $Gd_2O_3$ | 5.439 g |
| $MgCO_3$ | 3.342 g (0.05 mol excess) |
| $MnCO_3$ | 0.4311 g |
| $Al_2O_3$ | 0.1911 g |
| $SiO_2$ | 0.113 g |

Preparation: The starting materials are thoroughly mixed, introduced into a furnace at room temperature and heated to 560° C. under a nitrogen atmosphere. After a holding time of 30 min, the intermediate is removed and milled. This comminuted intermediate is again introduced into the furnace and then ignited under reducing conditions at 1015° C. for 4 h. After cooling to 500° C., the very finely crystalline end product is washed with water at 80° C. while stirring and then dried. The compound thus obtained has an emission band with a maximum at 628 nm and a value of $d_{50}$ of about 4.8 μm. The emission spectrum is shown in FIG. 2.

EXAMPLE 4

Luminescent substance according to Tab. 2, Example No. 9, having the formula $$Gd_{0.8}Ce_{0.2}Mg_{0.9}Mn_{0.1}Si_{0.1}B_{4.9}O_{10} \quad (BSCM).$$

The starting materials are:

| | |
|---|---|
| $H_3BO_3$ | 12.748 g |
| $CeO_2$ | 1.291 g |
| $Gd_2O_3$ | 5.439 g |
| $MgCO_3$ | 3.342 g (0.05 mol excess) |
| $MnCO_3$ | 0.431 g |
| $SiO_2$ | 0.226 g |

Preparation: All starting materials were treated as in Example No. 7, Tab. 2, but were ignited for 6 h at the stated reaction temperature. A luminescent compound having an emission band which has its maximum at 629 nm was formed.

EXAMPLE 5

Luminescent substance according to Tab. 3, Example No. 11, having the formula

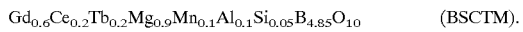   (BSCTM).

The starting materials are:

| | |
|---|---|
| $H_3BO_3$ | 4.801 g |
| $CeO_2$ | 0.431 g |
| $Gd_2O_3$ | 1.360 g |
| $MgCO_3$ | 1.113 g (0.05 mol excess) |
| $MnCO_3$ | 0.144 g |
| $SiO_2$ | 0.075 g |
| $Tb_4O_3$ | 0.467 g |
| $Al_2O_3$ | 0.064 g |

Preparation: The starting materials are heated to 580° C. in a nitrogen atmosphere and, after a holding time of 30 minutes, removed from the furnace and comminuted. The intermediate is then further ignited under reducing conditions for 2 h at 1025° C. After removal and comminution, a second ignition is carried out under the same conditions. The cooled and washed product has the characteristic emission lines of terbium at 542 nm and the manganese emission band at 628 nm, as shown in FIG. 3. The product is a very good small particle phosphor as in case of the examples above.

TABLE 1

| Example No. | Formula | Remark | Rel. int. [%] | Rel. integr. intensity [%] | q |
|---|---|---|---|---|---|
| Comparative Example | $Gd_{0.6}Ce_{0.2}Tb_{0.2}MgAl_{0.1}B_{4.9}O_{10}$ | washed hot | 100 | 100 | 0.93 |
| 1 | $Gd_{0.6}Ce_{0.2}Tb_{0.2}MgAl_{0.1}Si_{0.05}B_{4.85}O_{10}$ | washed hot | 103 | 102 | 0.95 |
| 2 | $Gd_{0.6}Ce_{0.2}Tb_{0.2}MgAl_{0.05}Si_{0.05}B_{4.9}O_{10}$ | EDTA | 101 | 100 | 0.94 |
| 3 | $Gd_{0.6}Ce_{0.2}Tb_{0.2}MgSi_{0.1}B_{4.9}O_{10}$ | EDTA | 99 | 99 | 0.91 |
| 4 | $Gd_{0.6}Ce_{0.2}Tb_{0.2}MgAl_{0.1}Si_{0.1}B_{4.8}O_{10}$ | washed hot | 101 | 100 | 0.93 |
| 5 | $Gd_{0.6}Ce_{0.2}Tb_{0.2}ZnAl_{0.05}Si_{0.05}B_{4.9}O_{10}$ | untreated | 102 | 101 | 0.94 |
| 6 | $Gd_{0.6}Ce_{0.2}Tb_{0.2}Mg_{0.75}Cd_{0.25}Al_{0.1}Si_{0.05}B_{4.85}O_{10}$ | untreated | 102 | 101 | 0.94 |

TABLE 2

| Example No. | Formula | Remark | Rel. int. [%] | Rel. integr. intensity [%] | q |
|---|---|---|---|---|---|
| Comparative Example | $Gd_{0.8}Ce_{0.2}Mg_{0.9}Mn_{0.1}Al_{0.1}B_{4.9}O_{10}$ | washed hot | 100 | 100 | 0.90 |
| 7 | $Gd_{0.8}Ce_{0.2}Mg_{0.9}Mn_{0.1}Al_{0.1}Si_{0.05}B_{4.85}O_{10}$ | washed hot | 104 | 105 | 0.94 |
| 8 | $Gd_{0.8}Ce_{0.2}Mg_{0.9}Mn_{0.1}Al_{0.05}Si_{0.05}B_{4.9}O_{10}$ | untreated | 102 | 104 | 0.93 |
| 9 | $Gd_{0.8}Ce_{0.2}Mg_{0.9}Mn_{0.1}Si_{0.1}B_{4.9}O_{10}$ | EDTA | 99 | 101 | 0.91 |
| 10 | $Gd_{0.8}Ce_{0.2}Mg_{0.9}Mn_{0.1}Al_{0.25}Si_{0.75}B_{4.9}O_{10}$ | washed hot | 100 | 101 | 0.91 |

TABLE 3

| Example No. | Formula | Remark | Rel. int. [%] | Rel. integr. intensity [%] | q |
|---|---|---|---|---|---|
| Comparative Example | $Gd_{0.6}Ce_{0.2}Tb_{0.2}Mg_{0.9}Mn_{0.1}Al_{0.1}B_{4.9}O_{10}$ | washed hot | 100 | 100 | 0.90 |
| 11 | $Gd_{0.6}Ce_{0.2}Tb_{0.2}Mg_{0.9}Mn_{0.1}Al_{0.1}Si_{0.05}B_{4.85}O_{10}$ | washed hot | 102 | 103 | 0.92 |
| 12 | $Gd_{0.6}Ce_{0.2}Tb_{0.2}Mg_{0.9}Mn_{0.1}Si_{0.1}B_{4.9}O_{10}$ | washed hot | 99 | 100 | 0.90 |

TABLE 4

| Example No. | Formula | Remark | Rel. int. [%] | Rel. integr. intensity [%] | q |
|---|---|---|---|---|---|
| Comparative Example | $Gd_{0.6}Ce_{0.2}Tb_{0.2}MgAl_{0.1}Ge_{0.05}B_{4.85}O_{10}$ | washed hot | 101 | 101 | 0.91 |
| 13 | $Gd_{0.6}Ce_{0.2}Tb_{0.2}MgAl_{0.1}Zr_{0.05}B_{4.85}O_{10}$ | washed hot | 100 | 100 | 0.9 |
| 14 | $Gd_{0.8}Ce_{0.2}Mg_{0.9}Mn_{0.1}Al_{0.1}P_{0.05}B_{4.85}O_{10}$ | washed hot | 102 | 101 | 0.91 |
| 15 | $Gd_{0.8}Ce_{0.2}Mg_{0.9}Mn_{0.1}Al_{0.1}V_{0.05}B_{4.85}O_{10}$ | washed hot | 99 | 99 | 0.89 |
| 16 | $Gd_{0.6}Ce_{0.2}Tb_{0.2}MgAl_{0.1}Nb_{0.05}B_{4.85}O_{10}$ | washed hot | 95 | 94 | 0.84 |
| 17 | $Gd_{0.8}Ce_{0.2}Mg_{0.9}Mn_{0.1}Al_{0.1}Ta_{0.05}B_{4.85}O_{10}$ | washed hot | 96 | 96 | 0.85 |

Owing to the boric acid excess necessary for the preparation and the excess of divalent cations, the charge compensation by oxygen atoms which occurs as a result of the chosen substitutions is not taken into account in Tab. 1 to Tab. 4 and in the examples described above, so that, instead of $O_{10+s}$, simply $O_{10}$ is stated as an approximation.

The results according to Tab. 1 for luminescent substance BSCT, (gadolinium magnesium borate, activated by cerium and terium), according to Tab. 2 for luminescent substance BSCM, according to Tab. 3 for luminescent substance BSCTM (gadolinium magnesium borate, activated by cerium, terium and manganese) and according to Tab. 4 for luminescent substance BSCX (gadolinium magnesium borate $XO_n$ with element is Si, Ge, P, Zr, V, Nb, Ta, W) demonstrate that the luminescence properties of the simple pentaborate luminescent substances known to date are considerably surpassed in some cases, in particular by the additional incorporation of silicon and the formation of luminescent silicate-borate substances whose structure based on the example of the luminescent silicate-borate substances according to Tab. 5, activated only with manganese, differs substantially from that of the luminescent pentaborate substances known to date, a lattice contraction generally taking place, as indicated by the increase in the magnitude of the q values from the diffractometer patterns.

In Tab. 5, Si=0 denotes the known luminescent pentaborate substance CMB as comparative example *. Example No. 8 with Si=0.05, Example No. 9 with Si=0.1 and Example No. 7 with Si=0.05 additionally denote luminescent silicate-borate substance BSCM. Analogous structural changes occur in all samples investigated; a decrease in the size of the central ion leading to a lattice contraction, but an increase in the size leading to a lattice expansion. In the first case, an improvement in the luminescence properties is predominantly observed; in the second case, no change or a slight decrease in comparison with the conventional luminescent pentaborate substances is observed.

All examples shown in Tab. 1–5 indicate that in particular silicate-borates but also germanate-borates and phosphate-borates are outstanding base lattices for activation with cerium, terbium, gadolinium and manganese. Owing to their excellent luminescence properties, they can be used individually or as mixtures with other phosphors in luminescent screens. Because of their very fine particles, the inventive compounds can be used to make thin coatings. In particular, they can be used as luminescent layers in low-pressure mercury discharge lamps, resulting in an increase of the luminous flux.

While the present invention has been particularly shown and described with respect to preferred embodiments thereof, it will be understood by those skilled in the art that the foregoing and other changes in form and detail may be made without departing from the spirit and scope of the present invention. It is therefore intended that the present invention not be limited to the exact forms described and illustrated but fall within the scope of the present invention.

We claim:

1. A luminescent metaborate substance consisting essentially of a substance having the formula $$(Y,La)_{1-x-y-z}Ce_xGd_yTb_z(Mg,Zn,Cd)_{1-p}Mn_pB_{5-q-s}(Al,Ga)_q(X)_sO_{10},$$

in which X is Si, Ge, P, Zr, V, Nb, Ta, W or two or more than two of the elements mentioned and furthermore

a) $y = z = p = 0$      $0.01 \leq x \leq 1.0$
                                $0 \leq q \leq 1.0$
                                $0 < s \leq 1.0$ or b) $z = p = 0$ and $y \neq 0$      $0.01 \leq x \leq 1 - y$
                                $0.02 \leq y \leq 0.80$
                                $0 \leq q \leq 1.0$
                                $0 < s \leq 1.0$ or c) $p = 0$ and $z \neq 0$      $0.01 \leq x \leq 1 - y - z$
                                $0 \leq y \leq 0.98$
                                $y + z \leq 0.99$
                                $0.01 \leq z \leq 0.75$
                                $0 \leq q \leq 1.0$
                                $0 < s \leq 1.0$ or d) $z = 0$ and $p \neq 0$      $0.01 \leq x \leq 1 - y$

TABLE 5

| A | B<br>Si = 0<br>CBM<br>comparative<br>Example* | C<br>Si = 0.05<br>BSCM Example 8 | D<br>Si = 0.05<br>additionally<br>BSCM Example 7 | E<br>Si = 0.1<br>BSCM Example 9 | B-C | B-D | B-E |
|---|---|---|---|---|---|---|---|
| hkl | Θ | Θ | Θ | Θ | ΔΘ | ΔΘ | ΔΘ |
| 100 | 13.5 | 13.52 | 13.52 | 13.54 | −0.02 | −0.02 | −0.04 |
| 10-2 | 14.24 | 14.24 | 14.24 | 14.26 | 0 | 0 | −0.02 |
| 11-1 | 15.48 | 15.46 | 15.5 | 15.54 | 0.02 | −0.02 | −0.06 |
| 11-2 | 18.42 | 18.42 | 18.44 | 18.44 | 0 | −0.02 | −0.02 |
| 002 | 18.84 | 18.86 | 18.88 | 18.9 | −0.02 | −0.04 | −0.06 |
| 20-2 | 20.5 | 20.52 | 20.5 | 20.5 | −0.02 | 0 | 0 |
| 020 | 23.34 | 23.36 | 23.36 | 23.5 | −0.02 | −0.02 | −0.06 |
| 21-1 | 23.64 | 23.54 | 23.66 | 23.68 | 0 | −0.02 | −0.04 |
| 021 | 25.24 | 25.22 | 25.24 | 25.26 | 0.02 | 0 | −0.02 |
| 12-1 | 25.56 | 25.58 | 25.56 | 25.58 | −0.02 | 0 | −0.02 |
| 21-3 | 25.92 | 25.92 | 25.94 | 25.92 | 0 | −0.02 | 0 |
| 120 | 27.1 | 27.1 | 27.1 | 27.12 | 0 | 0 | −0.02 |
| 12-2 | 27.48 | 27.48 | 27.48 | 27.5 | 0 | 0 | −0.02 |
| 102 | −29.78 | 29.8 | 29.78 | 29.84 | −0.02 | 0 | −0.06 |
| 022 | 30.2 | 30.22 | 30.22 | 20.24 | −0.02 | −0.02 | −0.04 |
| 10-4 | 30.86 | 30.86 | 30.86 | 30.88 | 0 | 0 | −0.02 |
| 21-4 | 31.14 | 31.14 | 31.14 | 31.16 | 0 | 0 | −0.02 |
| 121 | 31.64 | 31.64 | 31.64 | 31.68 | 0 | 0 | −0.04 |
| 30-2 | 31.98 | 32 | 32.02 | 32.06 | −0.02 | −0.04 | −0.08 |
| 12-3 | 32.3 | 32.32 | 32.32 | 32.32 | −0.02 | −0.02 | −0.02 |
| 22-3 | 33.1 | 33.1 | 33.08 | 33.1 | 0 | 0.02 | 0 |
| 31-2 | 34.12 | 34.14 | 34.16 | 34.16 | −0.02 | −0.04 | −0.04 |
| 31-4 | 35.04 | 35.08 | 35.1 | 35.08 | −0.04 | −0.06 | −0.04 |
| 220 | 36.22 | 36.22 | 36.22 | 26.26 | 0 | 0 | −0.04 |
| 211 | 36.46 | 36.48 | 36.48 | 36.5 | −0.02 | −0.02 | −0.04 |
| 023 | 37.16 | 37.18 | 37.18 | 37.2 | −0.02 | −0.02 | −0.04 |
| 31-1 | 37.6 | 37.62 | 37.66 | 37.68 | −0.02 | −0.06 | −0.08 |
| mean shift | | | | | −0.010 | −0.016 | −0.035 |

-continued

| | |
|---|---|
| | $0 \leq y \leq 0.99$ |
| | $0.01 \leq p \leq 0.30$ |
| | $0 \leq q \leq 1.0$ |
| | $0 < s \leq 1.0$ |
| or e) $p \neq 0$ and $z \neq 0$ | $0.01 \leq x < 1 - y - z$ |
| | $0 \leq y \leq 0.98$ |
| | $0.01 \leq z \leq 0.75$ |
| | $x + z \leq 0.99$ |
| | $0.01 \leq p \leq 0.30$ |
| | $0 \leq q \leq 1.0$ |
| | $0 < s \leq 1.0$. |

2. The luminescent metaborate substance of claim 1, wherein $y=z=p=0$ and $0.01 \leq x \leq 0.50$.

3. The luminescent metaborate substance of claim 1, wherein $z=p=0$ and $0.01 \leq x \leq 0.50$ and $0.05 \leq y \leq 0.75$ and $x+y \leq 1$.

4. The luminescent metaborate substance of claim 1, wherein $p=0$ and $0.01 \leq z \leq 0.75$ and $x+y+z=1$.

5. The luminescent metaborate substance of claim 1, wherein $z=0$ and $0.01 \leq p \leq 0.30$ and $x+y=1$.

6. The luminescent metaborate substance of claim 1, wherein $0.01 \leq p \leq 0.30$ and $0.01 \leq z \leq 0.75$ and $x+y+z=1$.

7. A luminescent screen comprising one or more of the luminescent metaborates of claim 1.

8. A luminescent layer comprising one or more of the luminescent metaborates of claim 1.

9. A low pressure discharge lamp comprising a lamp having a diameter of up to 5 mm and a radiant ultraviolet discharge power of at least more than 200 watts per square meter, said lamp including a discharge vessel having an inner and an outer surface, said inner surface including at least one luminescent metaborate having the formula $$(Y,La)_{1-x-y-z}Ce_xGd_yTb_z(Mg,Zn,Cd)_{1-p}Mn_pB_{5-q-s}(Al,Ga)_q(X)_sO_{10},$$

in which X is Si, Ge, P, Zr, V, Nb, Ta, W or two or more than two of the elements mentioned and furthermore

| | |
|---|---|
| a) $y = z = p = 0$ | $0.01 \leq x \leq 1.0$ |
| | $0 \leq q \leq 1.0$ |
| | $0 < s \leq 1.0$ |
| or b) $z = p = 0$ and $y \neq 0$ | $0.01 \leq x \leq 1 - y$ |
| | $0.02 \leq y \leq 0.80$ |
| | $0 \leq q \leq 1.0$ |
| | $0 < s \leq 1.0$ |
| or c) $p = 0$ and $z \neq 0$ | $0.01 \leq x \leq 1 - y - z$ |
| | $0 \leq y \leq 0.98$ |
| | $y + z \leq 0.99$ |
| | $0.01 \leq z \leq 0.75$ |
| | $0 \leq q \leq 1.0$ |
| | $0 < s \leq 1.0$ |
| or d) $z = 0$ and $p \neq 0$ | $0.01 \leq x \leq 1 - y$ |
| | $0 \leq y \leq 0.99$ |
| | $0.01 \leq p \leq 0.30$ |
| | $0 \leq q \leq 1.0$ |
| | $0 < s \leq 1.0$ |
| or e) $p \neq 0$ and $z \neq 0$ | $0.01 \leq x < 1 - y - z$ |
| | $0 \leq y \leq 0.98$ |
| | $0.01 \leq z \leq 0.75$ |
| | $x + z \leq 0.99$ |
| | $0.01 \leq p \leq 0.30$ |
| | $0 \leq q \leq 1.0$ |
| | $0 < s \leq 1.0$. |

* * * * *